United States Patent
Frascaroli et al.

(10) Patent No.: US 6,227,321 B1
(45) Date of Patent: May 8, 2001

(54) STRUCTURAL TUBE FOR A MOTOR VEHICLE UNIBODY

(75) Inventors: Stefano Frascaroli; John T. O'Toole, both of Waterford; Terry Marks, Novi; John Dziengowski, Dearborn Heights; Robert Stewart, St. Clair Shores; David L. Garber, Canton; Dorinel Neag, Walled Lake, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/282,677

(22) Filed: Mar. 31, 1999

(51) Int. Cl.[7] ............................. B60K 11/04; B60R 27/00
(52) U.S. Cl. ........................ 180/68.4; 180/311; 180/291; 280/796; 280/781; 296/194; 296/203.02
(58) Field of Search ...................................... 180/68.4, 300, 180/311, 291, 299; 280/800, 796, 781, 785, 797; 296/194, 203.02, 192

(56) References Cited

U.S. PATENT DOCUMENTS

| | | | |
|---|---|---|---|
| 4,542,934 | * 9/1985 | Komatsu et al. | 296/194 |
| 4,903,791 | 2/1990 | Cameron et al. . | |
| 4,919,474 | * 4/1990 | Adachi et al. | 296/194 |
| 5,090,105 | 2/1992 | DeRees . | |
| 5,106,148 | * 4/1992 | Ikeda et al. | 296/194 |
| 5,219,439 | 6/1993 | Moore et al. . | |
| 5,271,473 | * 12/1993 | Ikeda et al. | 180/68.4 |
| 5,348,114 | * 9/1994 | Yamauchi | 180/291 |
| 5,358,302 | 10/1994 | Schoen et al. . | |
| 5,358,304 | * 10/1994 | Kanemitsu et al. | 296/194 |
| 5,429,412 | 7/1995 | Schoen et al. . | |
| 5,533,780 | 7/1996 | Larson et al. . | |
| 5,544,714 | 8/1996 | May et al. . | |
| 5,597,198 | * 1/1997 | Takanishi et al. | 296/194 |
| 5,658,041 | * 8/1997 | Girardot et al. | 180/68.4 X |
| 5,667,004 | * 9/1997 | Kroetsch | 180/68.4 X |

* cited by examiner

Primary Examiner—J. J. Swann
Assistant Examiner—F. Zeender
(74) Attorney, Agent, or Firm—Marc Lorelli

(57) ABSTRACT

A front end assembly for a motor vehicle is provided including a U-shaped cross-car support member capable of being spot welded to a pair of cowl members and a pair of rail members. The U-shaped cross-car support member preferably comprises a hydroformed tube having a lower section disposed laterally with respect to a longitudinal axis of the vehicle, a pair of upwardly projecting side sections extending essentially orthogonal to the lower section, and a pair of outwardly projecting end sections extending essentially orthogonal to the upright sections so as to be nearly parallel to the lower section. A cowl bracket is connected to each of the end sections and is spot welded to each of the cowl members. Similarly, a rail bracket is connected to each of the side sections and is spot welded to each of the rails. Advantageously, the ability to spot weld the cowl and rail brackets enables the U-shaped support member to be installed within the front end assembly in a high speed automated process. Further, the welds between the support member and the cowls and rails substantially strengthens the cross-car stiffness of the front end assembly.

15 Claims, 2 Drawing Sheets

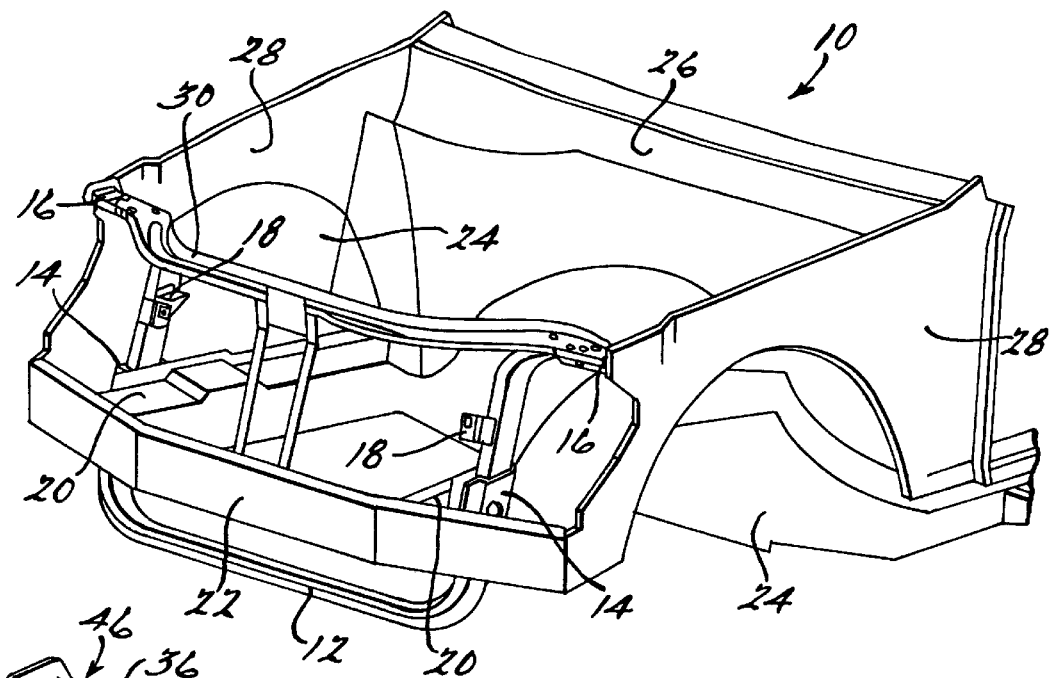
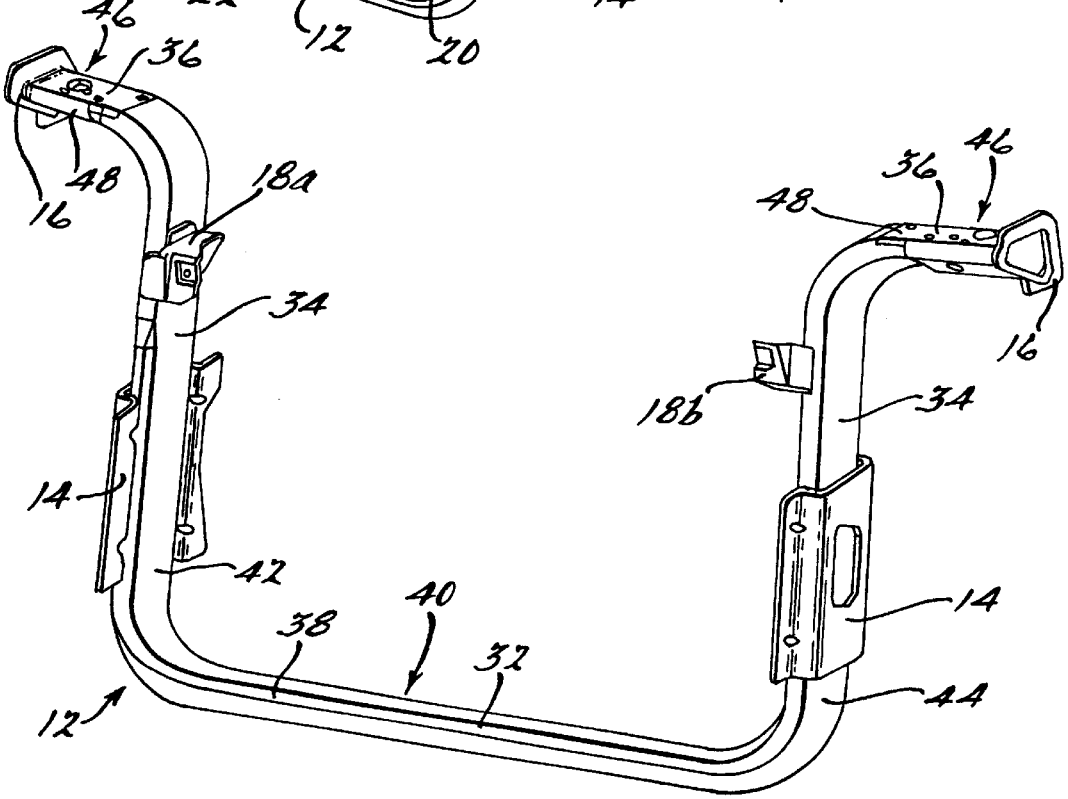

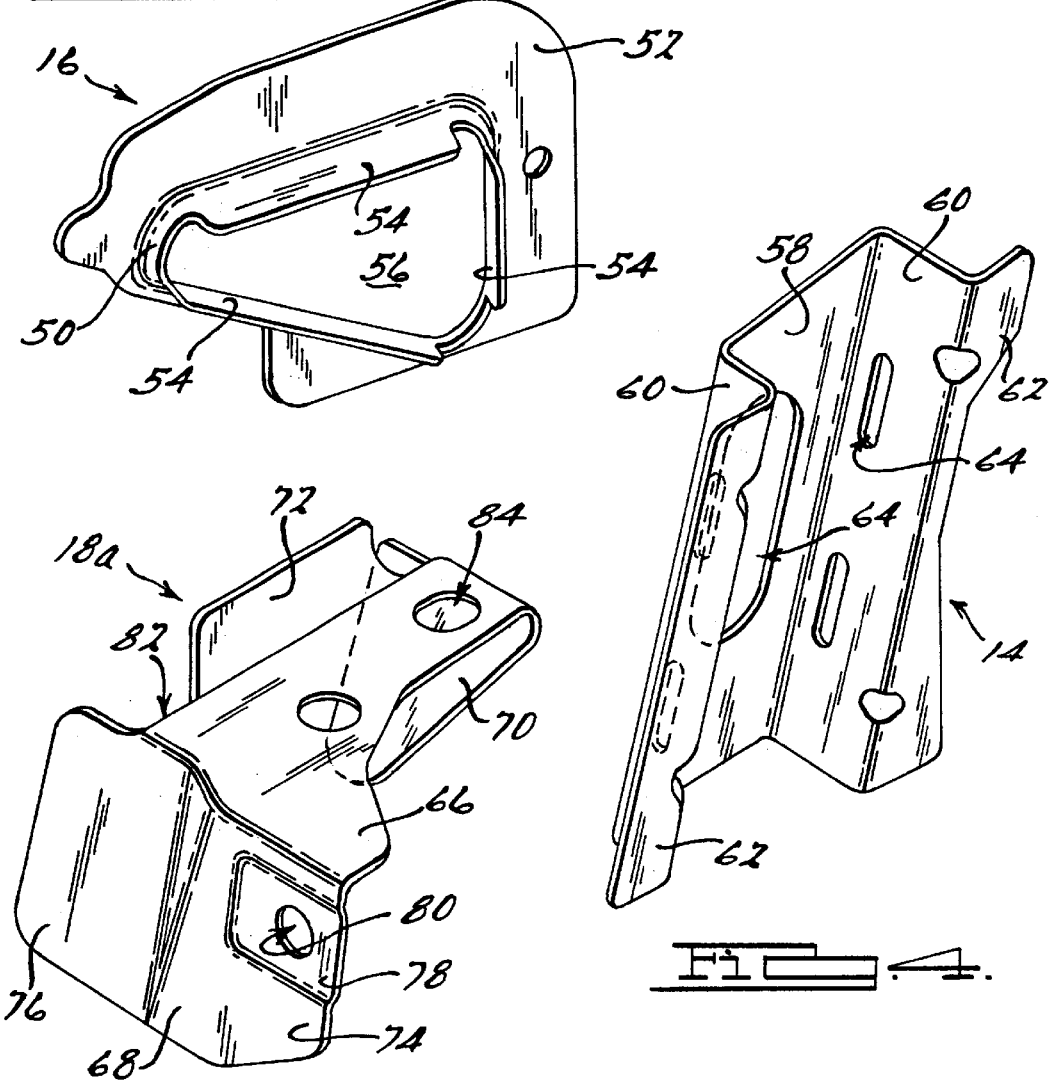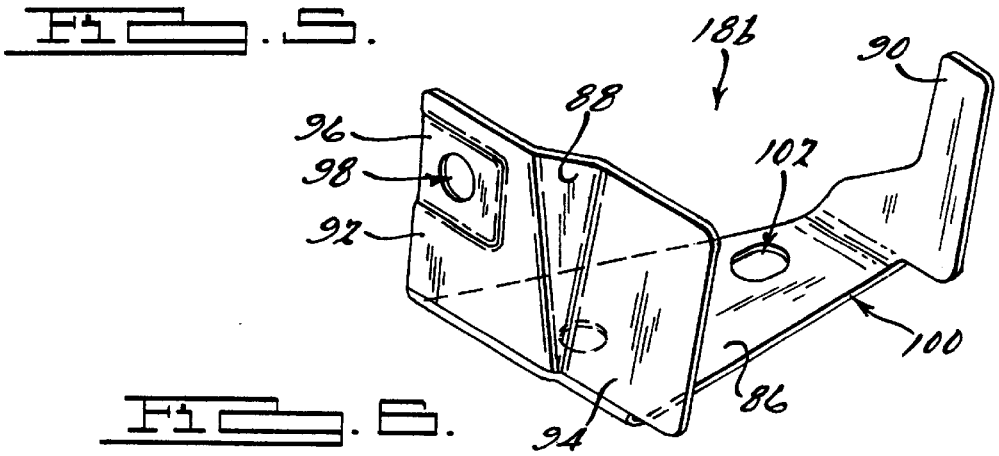

STRUCTURAL TUBE FOR A MOTOR VEHICLE UNIBODY

BACKGROUND OF THE INVENTION

1. Technical Field

The present invention generally relates to frame assemblies for automotive vehicles and, more particularly, to a structural tube for the front end assembly of a motor vehicle unibody.

2. Discussion

A front end assembly of a motor vehicle includes various components for supporting the vehicle's engine, front body panels, and front suspension. In a unibody construction, such a front end assembly commonly includes a pair of rails extending along the longitudinal axis of the vehicle, a bumper beam extending between the pair of rails, a pair of wheel wells disposed outboard of the rails and rearward of the bumper, a fascia coupled between the rearward ends of the wheel wells opposite the bumper beam, and a pair of cowls extending between the bumper beam and fascia outboard of the wheel wells. In order to provide a base for mounting the coolant pack of the vehicle (e.g., the radiator) a support member is sometimes provided behind the bumper beam and between the cowls.

According to the prior art, such a support member is bolted to the rails and cowls. While bolting the support member to the other components of the front assembly is satisfactory for providing a platform for mounting the coolant pack, such bolting is susceptible to torsional failure. That is, since bolting provides a point contact between the support member and the rails and/or cowls, the support member does not add substantially to the cross-car stiffness of the front assembly. Under extreme conditions, cross-car torsion may cause the point contacts to break.

Bolting also requires numerous parts and manual labor during assembly which adds to manufacturing costs. Additionally, bolting is not conducive to high speed automated processing. Further, bolting does not enable small positional adjustments among the components to account for local build variations.

In view of the foregoing, it would be desirable to provide a support member which yields additional cross-car rigidity and stiffness. It would also be desirable to employ an improved connection between the support member and the other components of the front assembly. Additionally, it would be desirable to provide a support member capable of high speed, automated processing.

SUMMARY OF THE INVENTION

The above and other objects are provided by a front end assembly for a motor vehicle including a U-shaped cross-car support member capable of being spot welded to a pair of cowl members and a pair of rail members. The U-shaped cross-car support member preferably comprises a hydroformed tube having a lower section disposed laterally with respect to a longitudinal axis of the vehicle, a pair of upwardly projecting side sections extending essentially orthogonal to the lower section, and a pair of outwardly projecting end sections extending essentially orthogonal to the upright sections so as to be nearly parallel to the lower section. A cowl bracket is connected to each of the end sections and is spot welded to each of the cowl members. Similarly, a rail bracket is connected to each of the side sections and is spot welded to each of the rails. Advantageously, the ability to spot weld the cowl and rail brackets enables the U-shaped support member to be installed within the front end assembly in a high speed automated process. Further, the welds between the support member and the cowls and rails substantially strengthens the cross-car stiffness of the front end assembly.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a perspective view of a front end assembly incorporating the support member of the present invention;

FIG. 2 is a perspective view of the U-shaped cross-car support member of the front end assembly of FIG. 1;

FIG. 3 is a perspective view of a cowl bracket of the support member of FIG. 2;

FIG. 4 is a perspective view of a rail bracket of the support member of FIG. 2;

FIG. 5 is a perspective view of a first radiator bracket of the support member of FIG. 2; and FIG. 6 is a perspective view of a second radiator bracket of the support member of FIG. 2.

DETAILED DESCRIPTION OF THE PREFERRED EMBODIMENTS

The present invention provides a support member for adding cross-car stiffness to the front end assembly of a motor vehicle. Advantageously, the support member may be spot welded to the other components of the front end assembly thereby enabling high speed automated manufacturing. In addition to the foregoing, the support member provides a convenient platform for mounting the vehicle's coolant package including the radiator and may be adjusted to account for build variations.

Turning now to the drawing figures, FIG. 1 illustrates a front end assembly for a motor vehicle generally at 10. The front end assembly 10 includes a U-shaped cross-car support member 12 having a pair of rail brackets 14, a pair of cowl brackets 16 and a pair of radiator brackets 18 connected thereto. A pair of longitudinally extending rails 20 are connected at a forward end to the support member 12. Preferably, the rails 20 are connected to the support member 12 by spot welding each rail 20 to a complimentary rail bracket 14.

A bumper beam 22 is connected to a distal end of each of the rails 20 so as to extend laterally therebetween. Although any conventional method may be used to couple the bumper beam 22 to the rails 20, it is presently preferred to use spot welding. A pair of wheel wells 24 are connected to the outboard edges of rails 20 rearward of the bumper beam 22. The wheel wells 24 are preferably coupled to the rails 20 and bumper beam 22 by bolting although other methods may be substituted therefore.

A fascia 26 is connected to the rear end of each of the wheel wells 24 opposite the bumper beam 22 preferably by spot welding. A pair of cowls 28 are connected to the outboard edge of the wheel wells 24 rearward of the bumper beam 22. The cowls 28 are also connected to the support member 12 and fascia 26. Preferably, the cowls 28 are connected to the support member 12 by spot welding each cowl 28 to a cowl bracket 16. A cross beam 30 is connected to each arm of the support member 12 so as to extend thereacross. Preferably, the cross beam 30 is connected to the support member 12 with fasteners such as bolts.

Turning now to FIG. 2, the U-shaped cross-car support member 12 is shown in greater detail. The support member 12 includes a first or lateral section 32, a pair of second or upright sections 34 integrally formed with the lateral section 32 at either end thereof, and a pair of third or end sections 36 integrally formed with the upright sections 34 at an opposite end as the lateral section 32. As can be seen, the upright sections 34 extend essentially orthogonal to the lateral section 32 while the end sections 36 project outwardly from the upright sections 34 so as to be essentially parallel with the lateral section 32. Although the term "upright" is used herein to describe the second sections 34, it should be noted that this does not necessarily mean that the second sections 34 are vertical but, rather, are upwardly projecting relative to the lateral section 32 even if at an angle.

The support member 12 is preferably tubular and incudes a leading edge 38, a trailing edge 40, an inboard surface 42 and outboard surface 44. The inboard and outboard surfaces 42 and 44 extend between the leading edge 38 and trailing edge 40 to provide the support member 12 with a generally triangularly shaped cross-section. Although other methods may be used in forming the support member 12 to its desired configuration, it is presently preferred to use the hydroform technique. During or after formation of the support member 12, contact points such as apertures 46 in the end sections 36 may be formed for accommodating additional components such as the cross beam 30 (see FIG. 1). If desired, additional plates, such as end plates 48, can be mounted to the support member 12 for added rigidity.

As noted in FIG. 1, a pair of cowl brackets 16 are connected to the support member 12. More particularly, the cowl brackets 16 are connected to the distal end of the end sections 36. Although other techniques are available for connecting the cowl brackets 16 to the end sections 36, it is presently preferred to use a bead of weld and in particular, a MIG weld. In contrast to bolting, welding enables the cowl bracket 16 to be adjusted slightly inboard or outboard to control the width of the vehicle. Although such an adjustment may be small, e.g., 2 mm, it accounts for build variations.

Referring momentarily to FIG. 3, the cowl bracket 16 is illustrated in greater detail. The cowl bracket 16 includes a triangular shaped body portion 50 having an annular flange 52 radially projecting substantially about an outer perimeter thereof. The annular flange 52 is specifically designed so as to enable spot welding of the cowl bracket 16 to the cowls 28 (see FIG. 1). The cowl bracket 16 also includes a plurality of axially extending flanges 54 projecting from an inner perimeter thereof perpendicularly relative to the annular flange 52. In the preferred embodiment, three axial flanges 54 are provided.

The inner perimeter of the body portion 50 and the axial flanges 54 define a central aperture 56 of the cowl bracket 16. Aperture 56 is shaped so as to compliment the circumferential surface of the end sections 36 of the support member 12 (see FIG. 2). As such, the cowl bracket 16 may be slidably disposed over the end sections 36 so that the axial flanges 54 are adjacent thereto. Thereafter, the axial flanges 54 may be welded to the inboard surface 42, outboard surface 44 and trailing edge 40 of the end sections 36.

Referring again to FIG. 2, the pair of rail brackets 14 are connected in an overlapping fashion to the outboard surface 44 of the upright sections 34. Although other methods may be employed, it is presently preferred to connect the rail brackets 14 to the upright sections 34 with a bead of weld and particularly a MIG weld. As opposed to bolting, welding enables the inboard/outboard position of the rail brackets 14 to be controlled. This enables adjustment to the width to account for build variations.

Referring momentarily to FIG. 4, a rail bracket 14 is illustrated in greater detail. The rail bracket 14 includes an outboard surface 58 integrally formed with a pair of side surfaces 50. The side surfaces 50 project essentially orthogonally with respect to the outboard surface 58. A pair of outwardly projecting flanges 62 are integrally formed with the side surfaces 50. The flanges 62 preferably project in a plane which is essentially parallel to the outboard surface 58 and essentially perpendicular to the side surfaces 60.

The flanges 62 are specifically formed to be spot weldable to the rails 20 (see FIG. 1). If desired, the flanges 62 may be shaped so as to compliment the receiving surface of the rails 20. Each of the side surfaces 60 as well as the outboard surface 58 includes at least one aperture 64 formed therein. Each aperture 64 facilitates welding of the rail bracket 14 to the leading edge 38, trailing edge 40 and outboard surface 44 of the upright sections 34 of the support member 12 (see FIG. 2).

Turning again to FIG. 2, the radiator brackets 18 include a passenger side radiator bracket 18a and a driver side radiator bracket 18b which are connected to the inboard surface 42 of the upright sections 34 of the support member 12. Although other techniques may be used, it is presently preferred to connect the radiator brackets 18a, b to the upright sections 34 with a bead of weld, particularly a MIG weld. Referring momentarily to FIG. 5, the passenger side radiator bracket 18a is illustrated in greater detail.

The radiator bracket 18a includes a top section 66, having a front flange 68, rear flange 70 and side flange 72 integrally formed therewith. The front flange 68 extends essentially perpendicular to the top section 66 and includes a radiator mounting portion 74 transitioning to a support member mounting portion 76. The transition from the support member mounting portion 76 to the radiator mounting portion 74 is preferably stepped away from the plane of the support member mounting portion 76. In this way, clearance is provided between a radiator eventually mounted to the radiator mounting portion 74 and the support member 12. To accommodate the mounting of a radiator to the radiator bracket 18a, the radiator mounting porion 54 is preferably provided with a recessed section 78 having an aperture 80 formed therethrough.

The rear flange 70 projects downwardly with respect to the top section 66 and is preferably formed essentially perpendicular thereto. The rear flange 70 and front flange 68 are essentially parallel and preferably project beyond an outboard edge 82 of the top section 66. In this way, the front flange 68 and rear flange 70 may be positioned so as to overlap the leading edge 38 and trailing edge 40 of the upright section 34 of the support member 12 (see FIG. 2). Thereafter, the flanges 68 and 70 may be welded thereto.

The side flange 72 is upturned relative to the top section 66 and preferably projects essentially perpendicularly thereto. When the radiator bracket 18a is placed on the upright section 34 of the support member 12, the side flange 72 is adjacent to the inboard surface 42 (see FIG. 2). Thereafter, the flange 72 may be welded thereto. Preferably, a pair of apertures 84 are provided in the top section 66 for accommodating additional mounting structure of a radiator eventually mounted thereto.

Referring now to FIG. 6, a more detailed view of the driver side radiator bracket 18b of FIG. 2 is illustrated. The driver side radiator bracket 18b includes a bottom section 86 having a front flange 88 and a rear flange 90 extending therefrom. The front flange 88 is preferably integrally formed with the bottom section 86 and is upturned relative thereto so as to extend essentially perpendicularly relative to the bottom section 86. The front flange 88 includes a radiator mounting porion 92 transitioning to a support member mounting portion 94. The transition from the support mounting portion 94 to the radiator mounting portion 92 is preferably stepped out with respect to the plane of the support member mounting portion 94. In this way, clearance is provided between a radiator eventually mounted to the radiator mounting portion 92 and the support member 12. To accommodate the mounting of a radiator thereto, the radiator mounting portion 92 preferably includes a recessed section 96 having an aperture 98 formed therein.

The rear flange 90 is preferably formed integrally with the bottom section 86 and upwardly projects perpendicularly thereto. The rear flange 90 and front flange 88 are preferably parallel and project beyond the outboard edge 100 of the bottom section 86. In this way, the rear flange 90 and front flange 88 may be positioned so as to overlap the trailing edge 40 and leading edge 38 of the upright section 34 of the support member 12 (see FIG. 2). Thereafter, the flanges 88 and 90 may be welded thereto. If desired, a down-turned side flange (not shown) may be provided on the outboard edge 100 of the bottom section 86 to provide a surface for mounting to the inboard surface 42 of the support member 12. Also, the bottom section 86 may be provided with at least one aperture 102 for accommodating additional mounting structure of a radiator eventually secured thereto.

Referring again to FIG. 1, in a manufacturing process, the front end assembly 10 is preferably assembled by providing the support member 12 having the rail brackets 14, cowl brackets 16 and radiator brackets 18 connected thereto. Thereafter, the rails 20 are connected to the rail brackets 14 preferably by spot welding. The bumper beam 22 is then mounted to the rails 20. The wheel wells 24 and cowls 28 are then mounted to the bumper beam 22, rails 20, and support member 12. The cowls 28 are preferably connected to the support member 12 by spot welding the cowls 28 to the cowl brackets 16. Thereafter, the cross beam 30 is bolted to the support member 12 and the fascia 26 is connected to the cowls 28. Subsequently, a radiator (not shown) is mounted to the radiator brackets 18.

Thus, a support member is provided for the front end assembly of a motor vehicle which includes brackets to enable spot welding by a high speed automated process. Due to the welding of the support member to the cowls and rails, the support member adds substantial cross-car stiffness to the front end assembly. Due to the welding of the brackets to the support member, the width of the support member can be controlled to account for build variations. Advantages in terms of piece part cost procurement, labor reduction, and weight removal are also realized.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A front end assembly for a motor vehicle comprising:
    a U-shaped cross-car support member having a lateral section, a pair of upright sections extending essentially orthogonal to said lateral section, and a pair of end sections extending essentially orthogonal to said upright sections so as to be essentially parallel to said lateral section;
    a pair of cowl members welded to said pair of end sections;
    a pair of rail members interconnected to said pair of upright sections; and
    a rail bracket interposed between each of said pair of upright sections and each of said pair of rail members, said rail bracket being spot welded to said rail members.

2. The front end assembly of claim 1 further comprising a cowl bracket interposed between each of said pair of end sections and each of said pair of cowl members.

3. The front end assembly of claim 2 wherein said cowl bracket is spot welded to said cowl members.

4. The front end assembly of claim 1 further comprising a pair of radiator brackets coupled to each of said pair of upright sections.

5. The front end assembly of claim 1 further comprising a cross-member coupled to said pair of end sections and extending therebetween.

6. The front end assembly of claim 1 further comprising a bumper beam coupled to said pair of rail members and extending therebetween.

7. The front end assembly of claim 6 wherein said bumper beam is further coupled to said pair of cowl members and extends therebetween.

8. A structural support member for a front end of a motor vehicle comprising:
    a one piece generally U-shaped member including:
    a first section extending across a longitudinal axis of said motor vehicle;
    a pair of second sections integrally formed at either end of said first section and upwardly extending relative thereto; and
    a pair of third sections integrally formed at an opposite end of said pair of second sections as said first section, said pair of third sections extending laterally away from said longitudinal axis of said vehicle;
    a rail bracket interdisposed between each of said pair of second sections and each of said pair of rails, said rail bracket being spot welded to said rail;
    wherein said U-shaped member is spot weldable to a frame of said motor vehicle;
    wherein said pair of second sections are spot welded to a pair of rails of same frame.

9. The structural support member of claim 8 wherein said pair of third sections are spot welded to a pair of cowls of said frame.

10. The structural support member of claim 9 further comprising a cowl bracket interposed between each of said pair of third sections and each of said pair of cowls, said cowl bracket being spot welded to said cowl.

11. The structural support member of claim 8 further comprising a radiator bracket coupled to said U-shaped member.

12. A method of forming a front end assembly of a motor vehicle comprising:

providing a generally U-shaped support member including a cross member, a pair of upright members extending from said cross member, and a pair of end members extending outwardly from said upright members;

spot welding a pair of rail brackets to said pair of upright members;

spot welding a pair of rails to said pair of rail brackets; and spot welding a pair of cowls to said pair of end members.

13. The method of claim 12 further comprising coupling a cross beam between said pair of end members.

14. The method of claim 13 wherein said cross beam is bolted to said pair of end members.

15. The method of claim 12 further comprising coupling a bumper beam between said pair of rails and between said pair of cowls.

* * * * *